United States Patent [19]

Mochida et al.

[11] Patent Number: 4,683,113

[45] Date of Patent: Jul. 28, 1987

[54] NUCLEAR FUEL ASSEMBLY

[75] Inventors: Takaaki Mochida; Junichi Yamashita; Toshiro Yoshioka; Michihiro Ozawa, all of Hitachi, Japan

[73] Assignees: Hitachi, Ltd.; Hitachi Engineering Co., Ltd., both of Tokyo, Japan

[21] Appl. No.: 734,604

[22] Filed: May 16, 1985

[30] Foreign Application Priority Data

May 16, 1984 [JP] Japan .................................. 59-98429

[51] Int. Cl.$^4$ .............................................. G21C 3/00
[52] U.S. Cl. .................................. 376/419; 376/428; 376/435; 376/447
[58] Field of Search ............... 376/419, 421, 428, 435, 376/447

[56] References Cited

U.S. PATENT DOCUMENTS 3,799,839  3/1974  Fischer ................................. 376/419
4,229,258  10/1980 Takeda ................................ 376/419

FOREIGN PATENT DOCUMENTS 58-26292  2/1983  Japan .................................... 376/419

Primary Examiner—Donald P. Walsh
Attorney, Agent, or Firm—Antonelli, Terry and Wands

[57]  ABSTRACT

A nuclear fuel assembly has a plurality of fuel rods each containing a multiplicity of fuel pellets. The fuel rods include a plurality of first fuel rods and a plurality of second fuel rods. Each of the first fuel rods contains a burnable poison over substantially the entire axial length thereof. The first fuel rod also has a greater means enrichment in the upper axial region thereof than that in the lower axial region thereof. Each of the second fuel rods contains no burnable poison and has a uniform enrichment distribution over substantially the entire axial length thereof. In each cross-section of the fuel assembly perpendicular to the axis thereof, the outer peripheral portion has a greater mean enrichment than the central portion. The first fuel rods are disposed in the peripheral portion except the outermost peripheral portion of the cross-section of the fuel assembly.

20 Claims, 28 Drawing Figures

FIG. 8

| 1.36 | 1.34 | 1.30 | 1.28 | 1.28 | 1.31 | 1.35 | 1.36 |
|------|------|------|------|------|------|------|------|
| 1.34 |      |      |      |      |      |      | 1.35 |
| 1.30 |      |      |      |      |      |      | 1.31 |
| 1.28 |      |      |      |      |      |      | 1.28 |
| 1.28 |      |      |      |      |      |      | 1.28 |
| 1.31 |      |      |      |      |      |      | 1.30 |
| 1.35 |      |      |      |      |      |      | 1.34 |
| 1.36 | 1.35 | 1.31 | 1.28 | 1.28 | 1.30 | 1.34 | 1.36 |

| 1.27 | 1.30 | 1.28 | 1.25 | 1.25 | 1.28 | 1.30 | 1.27 |
|------|------|------|------|------|------|------|------|
| 1.30 |      |      |      |      |      |      | 1.30 |
| 1.28 |      |      |      |      |      |      | 1.28 |
| 1.25 |      |      |      |      |      |      | 1.25 |
| 1.25 |      |      |      |      |      |      | 1.25 |
| 1.28 |      |      |      |      |      |      | 1.28 |
| 1.30 |      |      |      |      |      |      | 1.30 |
| 1.27 | 1.30 | 1.28 | 1.25 | 1.25 | 1.28 | 1.30 | 1.27 |

—23

FIG. 10
FIG. 11
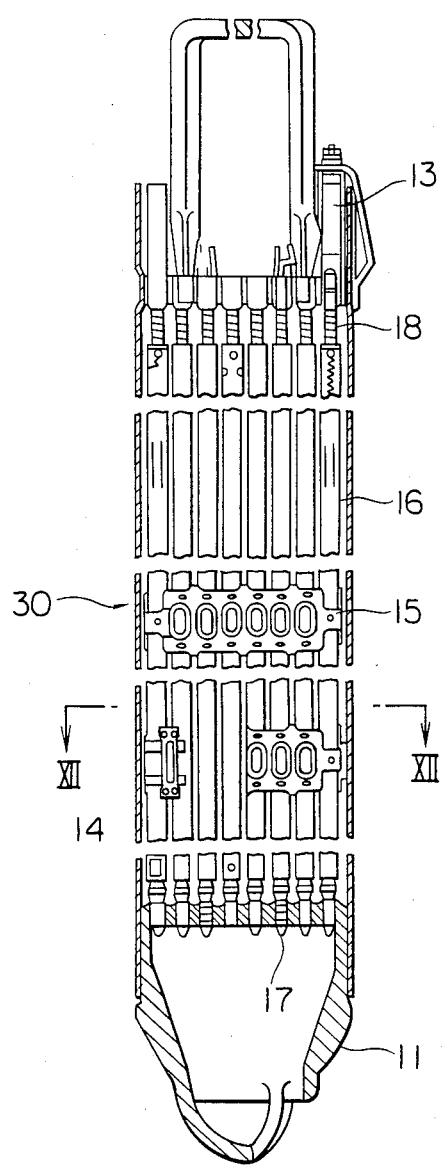
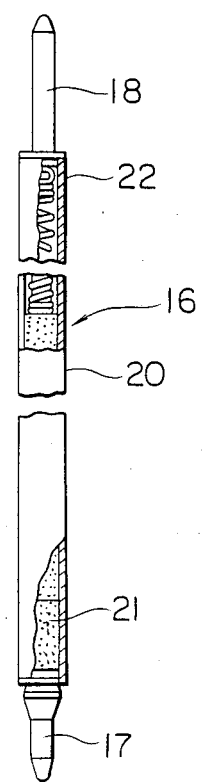

FIG. 16

| 1.30 | 1.28 | 1.29 | 1.32 | 1.32 | 1.27 | 1.26 | 1.29 |
|---|---|---|---|---|---|---|---|
| 1.28 |  |  |  |  |  |  | 1.26 |
| 1.29 |  |  |  |  |  |  | 1.26 |
| 1.32 |  |  |  |  |  |  | 1.28 |
| 1.32 |  |  |  |  |  |  | 1.29 |
| 1.27 |  |  |  |  |  |  | 1.26 |
| 1.26 |  |  |  |  |  |  | 1.26 |
| 1.29 | 1.26 | 1.26 | 1.28 | 1.29 | 1.26 | 1.26 | 1.28 |

| 1.26 | 1.24 | 1.25 | 1.29 | 1.29 | 1.25 | 1.24 | 1.26 |
|---|---|---|---|---|---|---|---|
| 1.24 |  |  |  |  |  |  | 1.24 |
| 1.25 |  |  |  |  |  |  | 1.25 |
| 1.29 |  |  |  |  |  |  | 1.29 |
| 1.29 |  |  |  |  |  |  | 1.29 |
| 1.25 |  |  |  |  |  |  | 1.25 |
| 1.24 |  |  |  |  |  |  | 1.24 |
| 1.26 | 1.24 | 1.25 | 1.29 | 1.29 | 1.25 | 1.24 | 1.26 |

40

NUCLEAR FUEL ASSEMBLY

BACKGROUND OF THE INVENTION

The present invention relates to a nuclear fuel assembly and, more particularly, to a nuclear fuel assembly suitable for use for a boiling water reactor.

The reactor core of a boiling water reactor is charged with a plurality of nuclear fuel assemblies each of which is constituted by a channel box, lower tie plate, upper tie plate and a multiplicity of fuel rods. The fuel rods arranged in the form of a bundle are held at their upper and lower ends by the upper and lower tie plates. The bundle of the fuel rods is disposed in a channel box secured to the upper tie plate. Each fuel rod is charged with a multiplicity of fuel pellets ($UO_2$ pellets). In each fuel assembly, there are several fuel rods having $UO_2$ pellets which contain gadolinea as a burnable poison. There also are two water rods disposed in the central region of the nuclear fuel assembly.

In general, a boiling water reactor exhibits a void distribution in the vertical or axial direction. Due to the variation of void reactivity along the axis, the boiling water reactor shows such a power distribution that the peak of the power is shifted to the lower side along the axis.

In order to attain a flat axial power distribution by obviating the axially downward shifting of the power peaking, it has been proposed to use a fuel assembly having different degrees of enrichment at the upper and lower regions thereof. One of such a fuel assembly is disclosed in the specification of the U.S. Pat. No. 4,229,258. In this fuel assembly, some of the fuel rods arranged in the peripheral region thereof have different degrees of enrichment at their upper and lower regions. More specifically, the upper region of each of such fuel rod has an enrichment which is about 15% higher than that in the lower region thereof.

In recent years, various studies have been made for the development of fuel assemblies suitable for higher burn-up, i.e., fuel assemblies which can be burnt up to a high degree. Such a fuel is obtained by arranging fuel rods rich in fissile material, i.e. fuel rods having high enrichment, in the vicinity of the channel box having a high density of thermal neutron flux. Japanese Patent Laid-Open No. 26292/1983 discloses a fuel assembly which can be burnt up to a high degree in accordance with the theory disclosed in U.S. Pat. No. 4,229,258.

SUMMARY OF THE INVENTION

Accordingly, an object of the invention is to provide a fuel assembly which is improved such that the difference in the power level between different cross-sections along the axis is minimized so as to flatten the power distribution in the axial direction of the fuel assembly.

Another object of the invention is to provide a fuel assembly having a simple construction constituted by a fewer number of kinds of the fuel rod.

Still another object of the invention is to provide a fuel assembly capable of improving the fuel economy.

To these ends, according to the invention, there is provided a fuel assembly having first fuel rods each containing a burnable poison over the substantial region in the axial direction thereof, and second fuel rods containing no burnable poison, each of said first fuel rods having such an enrichment distribution that the mean enrichment over the most part of the upper region thereof is higher than the mean enrichment over the most part of the lower region thereof, while each of said second fuel rods has a substantially uniform enrichment distribution over the entire axial region thereof.

BRIEF DESCRIPTION OF THE DRAWINGS

FIG. 8 is an illustration of the actual local power distribution in a cross-section at the upper region of the fuel assembly shown in FIG. 4;

FIG. 9 is an illustration of the actual local power distribution in a cross-section at the lower region of the fuel assembly shown in FIG. 4;

FIG. 10 is an illustration of the construction of a fuel assembly;

FIG. 11 is an illustration of the construction of a fuel rod;

FIG. 16 is an illustration of the actual local power distribution in a cross-section at the upper region of the fuel assembly shown in FIG. 14;

FIG. 17 is an illustration of the actual local power distribution in a cross-section at the lower region of the fuel assembly shown in FIG. 14;

DESCRIPTION OF THE PREFERRED EMBODIMENTS

The present invention has been attained as a result of a minute study on the characteristics of the known fuel assembly disclosed in Japanese Patent Laid-Open No. 29878/1983, as will be understood from the following description.

First of all, an explanation will be made with reference to the fuel assembly shown in U.S. Pat. No. 4,229,258 which provides a base for the fuel assembly shown in Japanese Patent Laid-Open No. 29878/1983.

Figure 1:
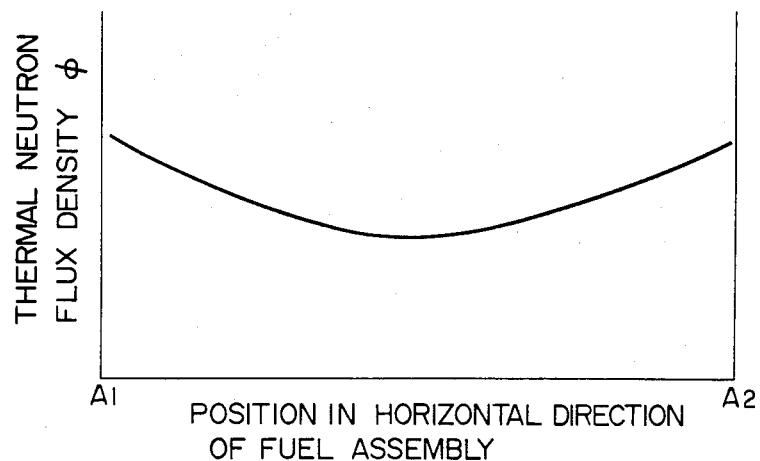
FIG. 1 is a diagram showing a thermal neutron flux density along a diagonal line in a cross-section of a conventional fuel assembly.

The fuel assembly of the U.S. Patent mentioned above exhibits a uniform power distribution along the axis thereof. In the fuel assembly used in a boiling water reactor, however, voids are generated within the channel box, whereas no void is generated outside the channel box. Therefore, in FIG. 4 attached to the U.S. Patent mentioned above, a non-uniform density distribution of water (moderator) appears in a vertical section which contains a corner of the channel box facing a control rod and another corner which is on the diagonal line passing the first-mentioned corner. More specifically, the water density is lower in the inside of the channel box than in the outside of the channel box. Therefore, the density of the thermal neutron flux $\phi$ exhibits such a distribution in the section containing above-mentioned two corners of the channel box that the density is low at the mid portion of the section and high outside the channel box, as will be seen from FIG. 1.

The power of each of the fuel rods constituting the fuel assembly is given by the following formula:

$$P = \phi \cdot \sigma_F \cdot N \qquad (1)$$

where, $\phi$ represents the thermal neutron flux density at the position of the fuel rod, $\sigma_F$ represents the fission cross-sectional area, and N represents the atomic number density of the fissile material in the fuel rod.

Figure 2:
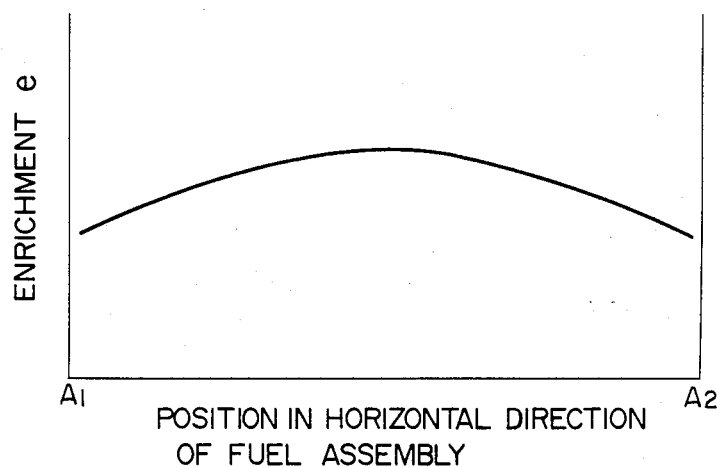
FIG. 2 is a diagram showing the enrichment distribution in the same cross-section as that shown in FIG. 1.

In the known fuel assemblies such as that shown in U.S. Pat. No. 4,229,258, the atomic number density N (which is in proportion to enrichment e) of the fissile material in the fuel rods disposed in the peripheral region of the fuel assembly where the thermal neutron flux density $\phi$ is high is selected to be small as compared with that of the fuel rods in the central region of the fuel assembly as shown in FIG. 2, in order to flatten the power distribution of each fuel rod (referred to as local power distribution, hereinunder) thereby minimizing the local power peaking which is the ratio between the maximum power of the fuel rod and the mean power of the fuel assembly. For instance, in the fuel assembly shown in the above-mentioned U.S. Patent, the fuel rods adjacent the channel box have a mean enrichment of uranium 235 which is about 25 to 50% lower than that in the fuel rods in the central region of the fuel assembly.

When a reactor core is charged with new fuel assemblies, the excess reactivity in the reactor core is so large as can never be controlled by the control rods solely. In order to suppress the excess reactivity in the beginning period of the burning, several fuel rods in the fuel assembly are made to contain gadolinea as a burnable poison as mentioned before. This burnable poison has an extremely large neutron absorption cross-sectional area, so that it is decreased more rapidly than the uranium 235 as the time elapses. Thus, the burnable poison is extinguished completely after a certain period of time so that the reactivity is not affected by the burnable poison in the later period of burning.

Figure 3:
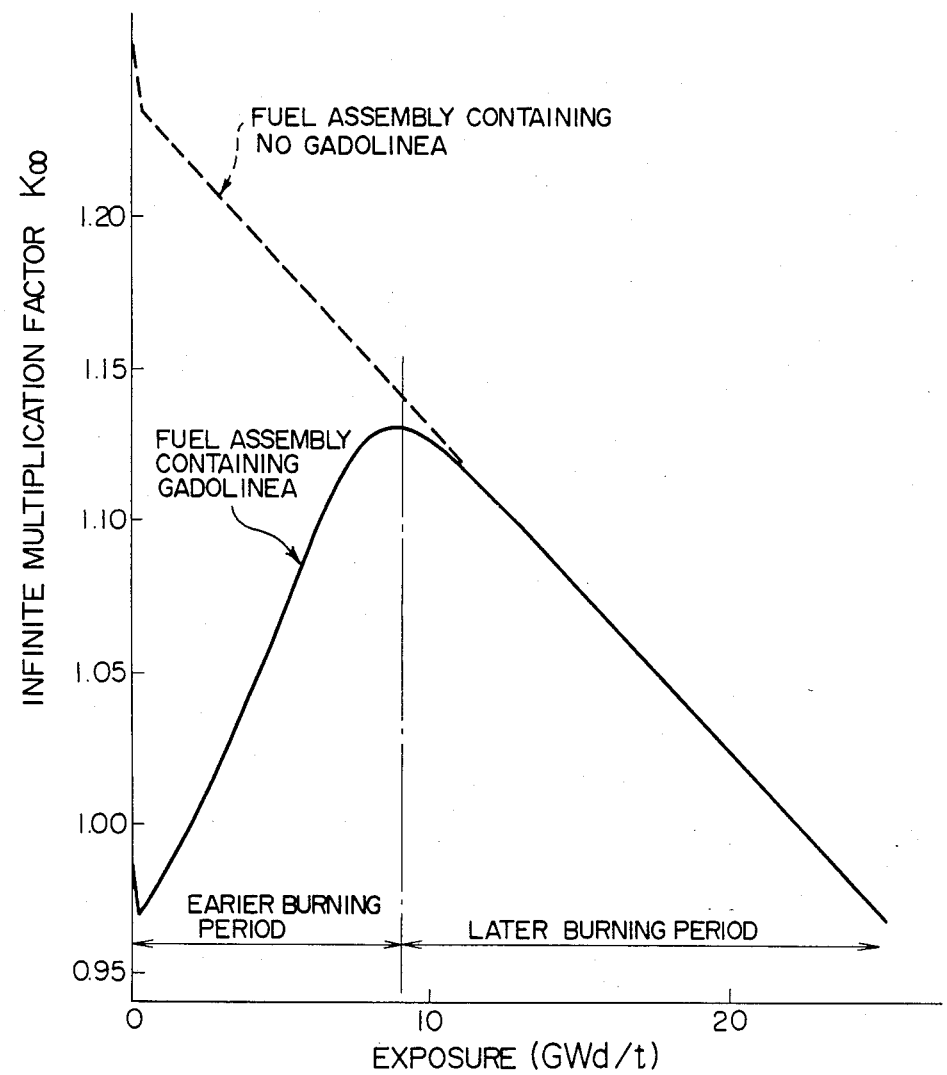
FIG. 3 is a diagram showing the relationship between the exposure and infinite multiplication factor.

FIG. 3 illustrates how the reactivity is suppressed by the use of gadolinea. More specifically, the full-line curve shows the infinite multiplication factor of the fuel assembly which contains gadolinea, while the broken-line curve shows the infinite multiplication factor of the fuel assembly which does not contain gadolinea. Thus, the reactivity suppressing effect produced by the gadolinea is shown as the difference between the values on both curves.

When the fuel assembly contains the gadolinea, the infinite multiplication factor is linearly increased in accordance with the increment of the burn-up degree and, after exhibiting a peak at exposure around 10 GWd/t at which the gadolinea is burnt out, decreases linearly in accordance with the increase in of exposure, as shown by the full-line curve in FIG. 3. The period in which the infinite multiplication factor increased up to the peak will be referred to as "earlier burning period", while the period after the peak will be referred to as "later burning period".

The fuel assembly shown in Japanese Patent Laid-Open No. 29878/1983 can provide a higher exposure without imparing the flat axial power distribution proposed by the above-mentioned U.S. Patent. Namely, the fuel assembly can be burnt for a longer period of time.

Figure 4:
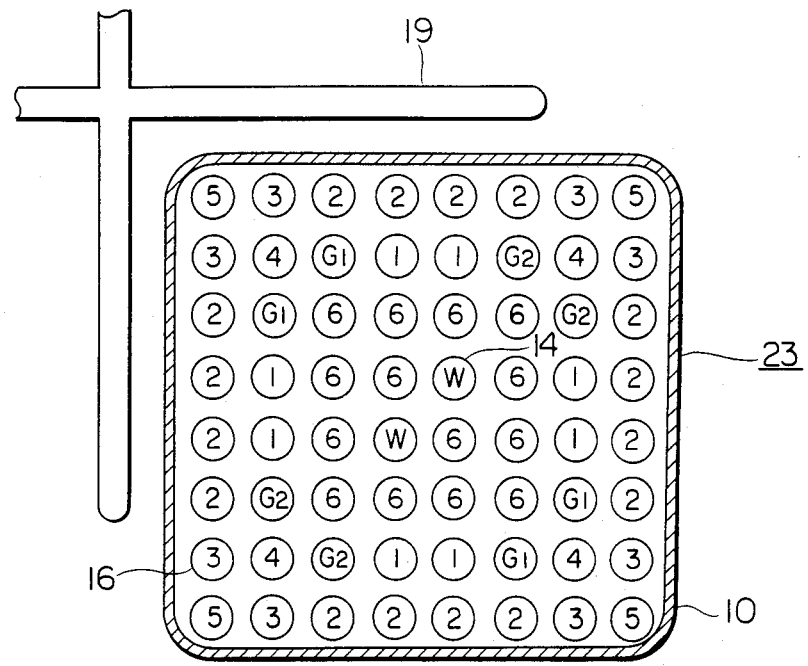
FIG. 4 is a cross-sectional view of a conventional fuel assembly.
Figure 5:
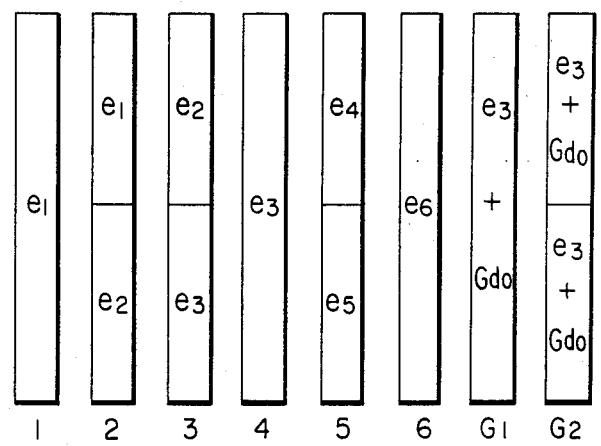
FIG. 5 is an illustration of enrichment distributions in fuel rods constituting the fuel assembly shown in FIG. 4.

FIG. 4 shows the cross-section of the fuel assembly as shown in Japanese Patent Laid-Open No. 29873/1983. This fuel assembly 23 is constituted by fuel rods 1 to 6, and $G_1$ and $G_2$. These fuel rods 1 to 6 and $G_1$, $G_2$ exhibit enrichment distributions and gadolinea density distributions as shown in FIG. 5. It will be seen that the fuel rods $G_1$ and $G_2$ have uniform gadolinea density distribution along the axis thereof. Both fuel rods $G_1$ and $G_2$ have an equal gadolinea density $Gd_0$. The fuel rods 1 to 6 do not contain gadolinea. Each of the fuel rods 1 to 6 and $G_1$, $G_2$ has a clad tube charged with pellets of $UO_2$ as the fissile material. The fuel rods 1 to 6 and $G_1$, $G_2$ have enrichments $e_1$ to $e_6$ as shown in FIG. 5. These enrichment are selected to meet the condition of $e_1 > e_2 > e_3 > e_4 > e_5 > e_6$. In this fuel assembly 23, fuel rods having mean enrichments greater than the mean enrichment of the fuel assembly are disposed in a large number in the peripheral region, whereas fuel rods having a mean enrichment lower than that of the fuel assembly are disposed in the central region of the fuel assembly.

In this fuel assembly 23, the power of the fuel rods in the peripheral region is increased so that the power is increased locally in the peripheral region of the fuel assembly throughout the period of operation of the nuclear reactor. The infinite multiplication factor of the fuel assembly 23 is increased substantially in linear proportion to the increase of the local power in the peripheral region. Therefore, the increase in the infinite multiplication factor of the fuel assembly can be maximized by increasing the local power peaking. The maximum value of the local power peaking is restricted by the thermal condition of the fuel rod, so that the increase in the infinite multiplication factor is materially limited. For attaining a further increase in the infinite multiplication factor, it is necessary to increase the local powers of the fuel rods in the peripheral region of the fuel rods. This, however, must be done equally over all fuel rods in the peripheral region.

Thus, the local power distribution and enrichment distribution which will maximize the increase in the reactivity are determined on condition that the mean enrichment and the maximum value of the local power peaking in the fuel assembly 23 are given.

Figures 6, 7:
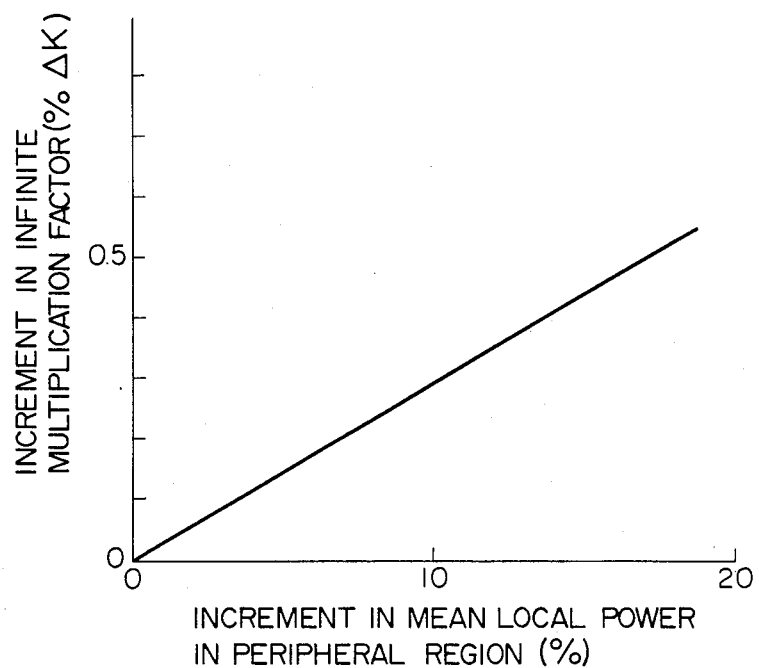
FIG. 6 is a diagram showing the relationship between increment in the mean local power in the peripheral portion and increment in the infinite multiplication factor.
FIG. 7 is an illustration showing the optimum local power distribution in the fuel assembly cross-section shown in FIG. 4.

FIG. 7 shows an example of the optimum local power distribution in the peripheral region, particularly in the outermost peripheral region, of the fuel assembly when the local power peaking factor is 1.30. In this Figure, each square represents each fuel rod.

The outer peripheral region of the fuel assembly 23 includes both the fuel rods having high enrichment intended for attaining high local power peaking and fuel rods having two axial regions of different enrichments intended for suppressing the axial power peaking. In this fuel assembly 23, the axial power peaking is suppressed such as to allow a corresponding increase in the local power in the peripheral region, thus attaining a greater reactivity gain.

This fuel assembly 23, however, proved the following disadvantage. Namely, since the fuel rods 2 and 3 having axial regions of different enrichments are disposed in the peripheral region as shown in FIG. 4, the local power distribution is deviated from the optimum power distribution shown in FIG. 7 either in the upper region or the lower region of the fuel assembly 23. This makes it impossible to attain the local power distribution for maximizing the reactivity both in the upper and lower regions of the fuel assembly. FIGS. 8 and 9 show, respectively, the local power distributions at the upper and lower regions of the fuel assembly 23 in the beginning of burn-up. These local power distributions cannot provide a uniform power peaking of, for example, 1.30 over the peripheral region, particularly in the outermost region, of the fuel assembly, unlike the local power distribution shown in FIG. 7. In addition, a difference of local power distribution is produced in the outermost region between the upper and lower regions of the fuel assembly 23.

As a result of an intense study on the characteristics of the fuel assembly 23, the present inventors have found that the above-explained problems of the known fuel assemblies can be obviated by providing a difference in the enrichment between the upper and lower regions of each fuel rod which contain a burnable poison over almost entire axial region thereof.

More specifically, the power P of the fuel rod is proportional to the product of the enrichment e and the thermal neutron flux density $\phi$. Namely, the condition of $P = e \cdot \phi$ is met. Therefore, if a fuel rod having a large thermal neutron flux density $\phi$ or a large power P is made to have such an enrichment distribution as being high in the upper region than in the lower region, the change in the power caused by a given change in the enrichment e becomes excessively large, resulting in a large difference in the power between the upper and lower regions of the fuel rod.

In contrast to the above, in the case of a fuel rod which contains gadolinea over almost entire axial region thereof, the thermal neutron flux density $\phi$ is small due to the presence of gadolinea, so that only a small change in the power P is caused by a given change in the enrichment e. Thus, the fuel rod containing gadolinea over almost entire axial region thereof exhibits a comparatively small change in the axial power distribution. For this reason, when the difference in the enrichment between the upper and lower regions is provided in a fuel rod which contains gadolinea over almost entire axial region thereof, the local power distributions in the upper and lower regions of the fuel rod are substantially equalized.

The present invention is based upon the discovery explained hereinbefore. The invention will be fully understood from the following description of the preferred embodiments.

FIG. 10 shows a preferred embodiment of the fuel assembly in accordance with the invention. The fuel assembly 30 has a channel box 10, a lower tie plate 11, an upper tie plate 12, spacers 15 and fuel rods 16. The fuel rods 16 are held at their lower and upper ends by the lower tie plate 11 and the upper tie plate 12. A plurality of the spacers 15 are arranged in the axial direction such as to maintain predetermined gaps between adjacent fuel rods. The channel box 10 is secured to the upper tie plate 12 and surrounds the bundle of the fuel rods 16 held by the spacers 15. A channel fastener 13 is secured to the upper tie plate 12.

FIG. 11 shows the detail of the fuel rod 16. The fuel rod 16 has a clad tube 20 charged with a multiplicity of fuel pellets 21 and closed at its upper and lower ends by means of upper and lower end plugs 17 and 18. The fuel pellets 21 are pressed by a spring 22 disposed in a gas plenum defined in the clad tube 20.

Figure 12:
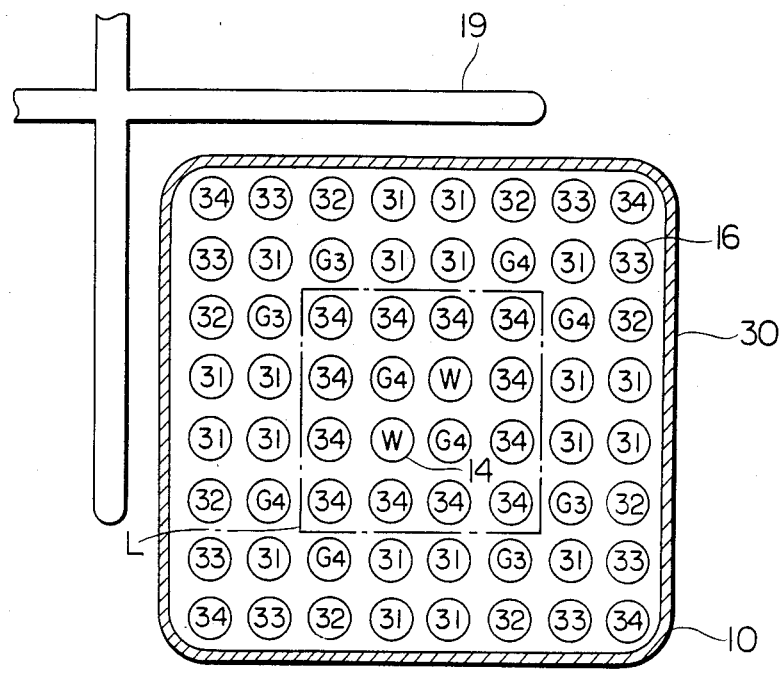
FIG. 12 is a cross-sectional view of a preferred embodiment of the fuel assembly in accordance with the invention.

FIG. 12 is a sectional view of the fuel assembly taken along the line XII—XII of FIG. 10. Fuel rods 16 are arranged in a lattice-like form within the channel box 10. Two water rods 14 are disposed in the central region of the channel box 10. There are several fuel rods 16 which contain gadolinea as a burnable poison. Water gaps are formed between adjacent fuel assemblies. These water gaps are adapted to receive control rods 19.

Figure 13:
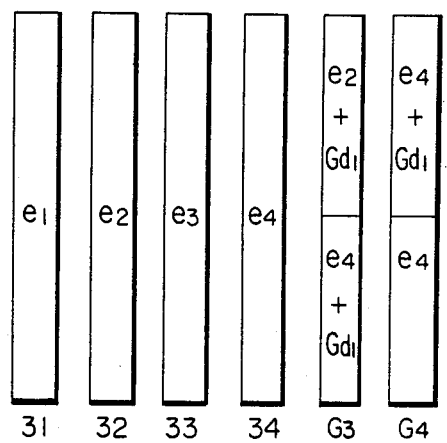
FIG. 13 is an illustration of enrichment distributions in fuel rods constituting the fuel assembly shown in FIG. 12.

The fuel rods 16 disposed in the fuel assembly 30 can be sorted into 6 (six) kinds: namely, fuel rods 31, 32, 33, 34, $G_4$ and $G_5$ which have enrichment distributions and gadolinea distributions as shown in FIG. 13. These fuel rods 31 to 34, $G_4$ and $G_5$ are disposed within the channel box 10 in a pattern shown in FIG. 12. The fuel rods 31 to 34 contain fuel pellets 21 of $UO_2$ as the nuclear fuel. These fuel pellets contain uranium 235 as the fissile material. These fuel rods 31 to 34 do not contain gadolinea as the burnable poison. On the other hand, the fuel rods $G_3$ and $G_4$ have $UO_2$ fuel pellets which contain gadolinea together with the uranium 235. The enrichments $e_1$ to $e_4$ in the fuel rods shown in FIG. 13 are determined to meet the conditions of $e_1 > e_2 > e_3 > e_4$. The fuel rods 31 to 34 and $G_4$ have a uniform enrichment over the entire axial length thereof. The upper region of the fuel rod $G_4$ above the level of 11/24 of the effective length of fuel as measured from the bottom of the effective length of fuel uniformly contains gadolinea, while the lower region below the abovementioned level does not contain gadolinea. The term "effective length of fuel" means the length or region of the fuel rod charged with the nuclear fuel material, i.e., the fuel pellets. The fuel rod $G_3$ contains gadolinea uniformly over the entire axial length thereof. The fuel rods $G_3$ and $G_4$ have an equal density of gadolinea. In the fuel rod $G_3$, the upper region above the level of 11/24 of the entire length as measured from the bottom of the fuel has a higher enrichment that the lower region below the above-mentioned level. Namely, the fuel rod $G_3$ has upper and lower regions having different enrichments, but the enrichment is uniform in each of the upper and lower regions.

The fuel assembly 30 having the fuel rods $G_3$ and $G_4$ naturally have two regions: namely, an upper region above the level of 11/24 of the effective fuel length as measured from the bottom of the effective fuel length and a lower region below the above-mentioned level. The mean enrichment in a plane perpendicular to the axis of the fuel assembly within the upper region is greater than that in a plane perpendicular to the axis of the fuel assembly within the lower region thereof. In addition, the amount of gadolinea contained by the upper region of the fuel assembly 30 is greater than that contained by the lower region of the same. It is to be understood also that the upper region of the fuel assembly 30 has a greater infinite multiplication factor than the lower region.

Thus, the amount of gadolinea contained by the upper region is greater than that contained by the lower region. This axial gadolinea distributions serves to provide a smaller infinite multiplication factor than in the lower region of the fuel assembly 30. On the other hand, the upper region of the fuel assembly 30 has a greater mean enrichment than the lower region of the same. This enrichment distribution serves to provide a greater infinite multiplication factor in the upper region than in the lower region of the fuel assembly. In the fuel assembly of the invention, the mean enrichment in the upper region is selected to be large enough to compensate for any reduction in the infinite multiplication factor due to the presence of the gadolinea in the upper region, so that the fuel assembly as a whole exhibits a greater infinite multiplication factor in the upper region than in the lower region.

Referring to FIG. 12 showing the fuel assembly 30 in a cross-section perpendicular to the axis thereof, two regions are assumed in this cross-section of the fuel assembly: namley, a peripheral region outside the one-dot-and-dash line L which is an annular region having two layers of fuel rods, and a central region inside the one-dot-and-dash line and having three and four layers of fuel rods. In the described embodiment of the fuel assembly, the mean enrichment in the peripheral portion is greater than that in the central region.

As stated before, in the described embodiment of the fuel assembly, the axial enrichment distribution is created by providing an axial enrichment distribution in the fuel rods $G_3$ which contain gadolinea over almost the entire axial region thereof and, therefore, the upper and lower regions of the fuel rod $G_3$ has a substantially equal power distribution. Consequently, the difference in the local power between the peripheral region of the upper region and the peripheral region in the lower region is minimized. In fact, the local powers of these peripheral regions become substantially equal to each other. This effect is maximized because the fuel rods $G_3$ are disposed in the portion of the peripheral region except the outermost portion. Consequently, the reactivity is increased and a higher fuel economy is attained. It is to be noted also that, while the known fuel assembly mentioned before employs 8 kinds of fuel rods, the described embodiment of the fuel assembly of the invention employs only six kinds of fuel rods, thus remarkably simplifying and facilitating the production of the fuel assembly. Furthermore, the described embodiment of the fuel ssembly provides the same advantage as that offered by the fuel assembly shown in FIG. 4 of Japanese Patent Laid-Open No. 26292/1983, i.e., a longer period of burning of the fuel assembly, because the mean enrichment is greater in the peripheral region than in the central region. The described embodiment of the fuel assembly also produces the same effect as that provided by the fuel assembly shown in FIG. 4 of U.S. Pat. No. 4,229,258, i.e., a flat or uniform axial power distribution of the fuel assembly, because the mean enrichment is higher in the upper region than in the lower region of the fuel assembly. This effect becomes appreciable after the burning of the gadolinea in the fuel assembly 30. This effect eliminates the use of control rods which are to be inserted only to small depth, and the power of the nuclear reactor can be controlled only by means of control rods which are to be inserted to a large depth. Consequently, the control operation for the control rods can be remarkably simplified. Preferably, the boundary between the upper and lower regions is positioned within the range between ⅓ and 7/12 of the fuel effective length as measured from the bottom of the fuel effective length.

In the described embodiment of the fuel assembly, not only the enrichment but also the amount of gadolinea is greater in the upper region than in the lower region. This in turn produces an effect called "spectrum shift" which is stated in lines 7 to 27, page 10 of the specification of U.S. patent application No. 548,845 and shown in FIGS. 5 to 7 attached to this U.S. patent specification. This spectrum shift effect also contributes to an increase in the discharged exposure of fuel burn-up, i.e., to a prolongation of period of burning of the fuel.

Figure 14:
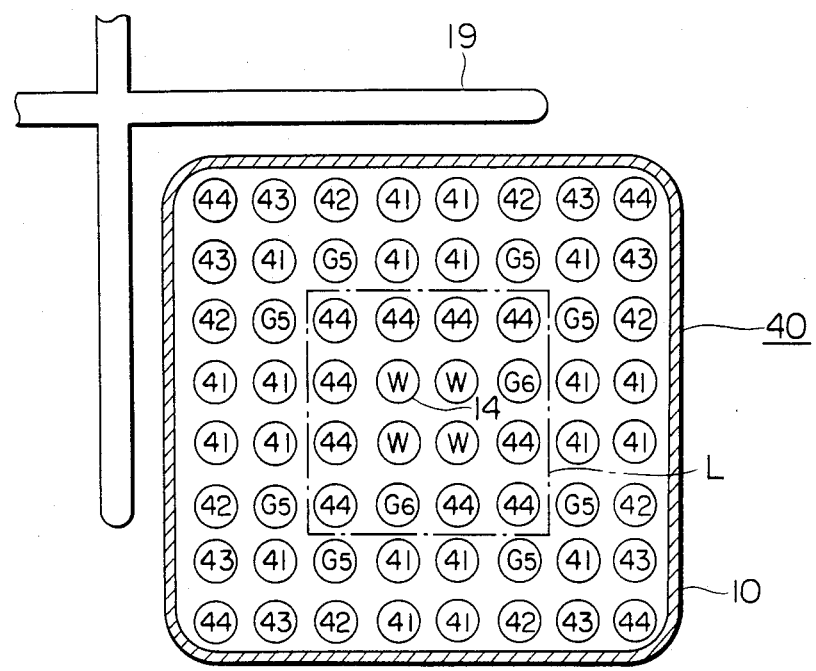
FIG. 14 is a cross-sectional view of another embodiment of the fuel assembly in accordance with the invention.
Figure 15:
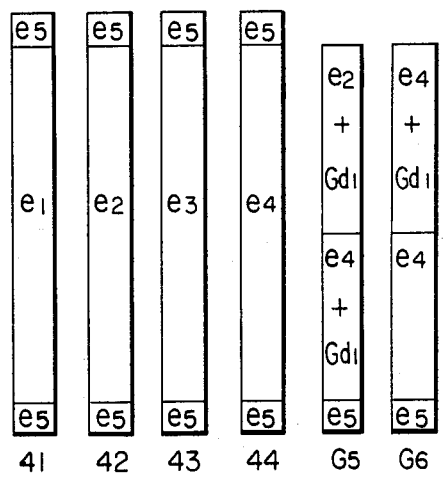
FIG. 15 is an illustration of enrichment distributions in fuel rods constituting the fuel assembly shown in FIG. 14.

Another embodiment of the invention will be described hereinunder with reference to FIGS. 14 and 15. The fuel assembly 40 of this embodiment has six kinds of fuel rods, i.e., fuel rods 41 to 44, $G_5$ and $G_6$, which are arranged in a manner shown in FIG. 14 and having enrichments and gadolinea densities as shown in FIG. 15. As will be understood from a comparison between FIG. 13 and FIG. 15, the fuel rods 41 to 44, $G_5$ and $G_6$ used in this embodiment are similar to the fuel rods 31 to 34, $G_3$ and $G_4$ of the first embodiment shown in FIG. 13, except that they are provided at their one or both ends with layers of natural uranium $e_5$. Usually, the power is not so large at each axial end of the fuel rod, so that only a small discharged exposure is attained at such axial ends even if these axial ends are charged with enriched uranium. Rather, the use of enriched uranium in such axial ends leads to a wasteful use of the uranium. From this point of view, the embodiment of the fuel assembly shown in FIGS. 14 and 15 employs layers of natural uranium in one or both ends of the fuel rods, thus minimizing the wasteful use of the uranium. The fuel rods $G_5$ and $G_6$ do not have the layer of natural uranium $e_5$ in their upper ends. The enrichment $e_4$ has a greater content of uranium 235 than the natural uranium $e_5$. These fuel rods $G_5$ and $G_6$ contain gadolinea and, therefore, produces large volume of gases during the operation of the nuclear reactor. In this embodiment of the fuel assembly, a sufficiently large volume of gas plenum is provided on the upper end of each of the fuel rods $G_5$ and $G_6$ which are devoid of the layers of natural uranium $e_5$.

The effective fuel length of the fuel assembly 40 as a whole is equal to that of the fuel rods 41 to 44. The length of the region charged with the natural uranium is 1/24 of the effective fuel length. The fuel rods $G_5$ and $G_6$ containing gadolinea are sectioned axially into two regions: namely, an upper region above the level 11/24 of the fuel effective length as measured from the bottom of the fuel effective length and a lower region below the above-mentioned level. The fuel rod $G_5$ contains gadolinea uniformly over almost the entire axial region thereof except the lower end constituted by the natural uranium e₅. The enrichment in the most part of the lower region of the fuel rod $G_5$ except the lower end portion having the natural uranium is lower than the enrichment in the most part of the upper region thereof. Each of the fuel rods 41 to 44 and $G_6$ has a substantially uniform enrichment distribution over the most part of the axial region thereof except the portions charged with the natural uranium. The upper region of the fuel rod $G_6$ uniformly contains gadolinea at a density equal to that in the fuel rod $G_5$.

The fuel assembly 40 of this embodiment is materially identical to the fuel assembly 30 of the first embodiment except that the fuel rods are charged at their one or both axial ends with natural uranium. The enrichments and the gadolinea densities of the fuel rods 41 to 44, $G_5$ and $G_6$ are shown in the following table.

TABLE 1

| No. of Fuel Rods | | 41 | 42 | 43 | 44 | $G_5$ | $G_6$ |
|---|---|---|---|---|---|---|---|
| Upper region | Enrichment wt % | 4.1 | 3.8 | 3.2 | 2.5 | 3.8 | 2.5 |
| | Gadolinea density wt % | 0 | 0 | 0 | 0 | 3.5 | 2.0 |
| Lower region | Enrichment wt % | 4.1 | 3.8 | 3.2 | 2.5 | 2.5 | 2.5 |
| | Gadolinea density wt % | 0 | 0 | 0 | 0 | 3.5 | 0 |

FIG. 16 shows the local power distribution in the outermost portion of the upper region in the fuel assembly 40 in the beginning of burn-up, while FIG. 17 shows the local power distribution in the outermost portion of the lower region of the fuel assembly 40 in the beginning of burn-up. From these Figures, it will be seen that the local power in the outermost portion in the upper region is almost equal to that in the outermost portion in the lower region. Thus, the fuel assembly 40 of this embodiment offers the same advantage as that produced by the fuel assembly 30 of the first embodiment.

Figure 18:
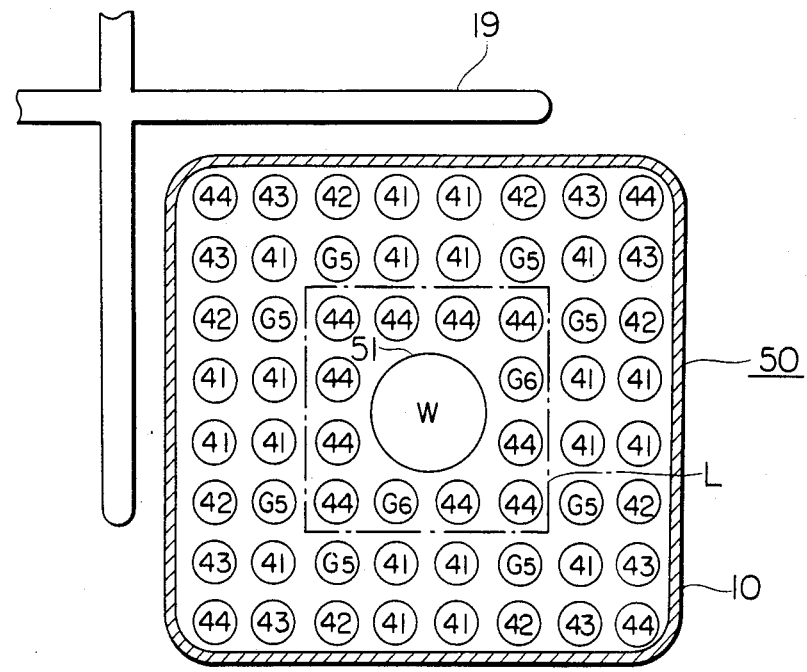
FIGS. 18, 19, 20, 22, 23, 25 and 27 are cross-sectional views of different embodiments of the fuel assembly in accordance with the invention.

FIG. 18 shows still another embodiment of the invention. The fuel assembly 50 of this embodiment has a construction similar to that of the fuel assembly 40 of the second embodiment, except that four water rods disposed in the central portion of the fuel assembly 40 is substituted by a single large water rod 51. Thus, the fuel assembly 50 of this embodiment produced substantially the same effect as that produced by the fuel assembly 40.

Figure 19:
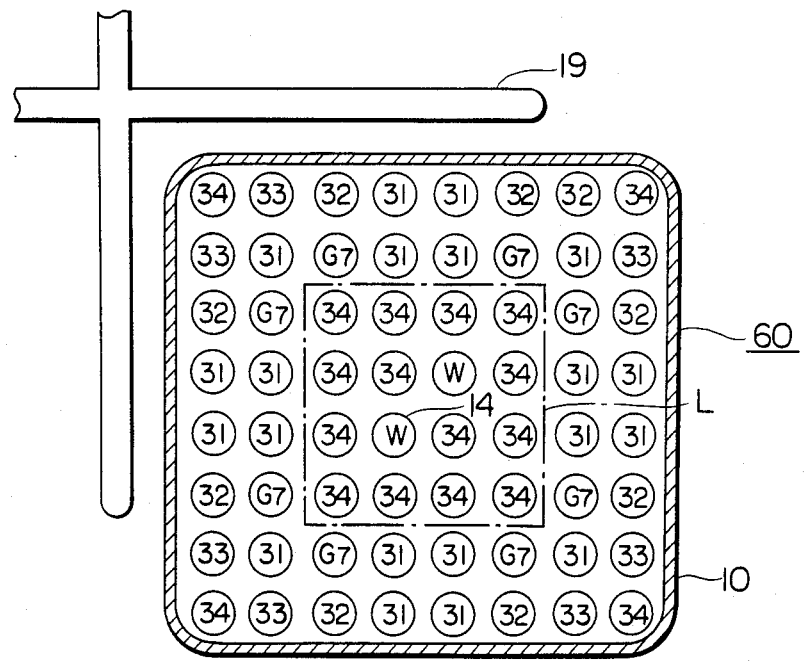

FIG. 19 shows a further embodiment of the invention. The fuel assembly 60 of this embodiment employs the fuel rods 31, 32, 33 and 34 used in the first embodiment explained in connection with FIG. 13. In this embodiment, however, these fuel rods are arranged in a manner shown in FIG. 19. It will be seen also that the fuel assembly 60 of this embodiment employs a fuel rod $G_7$ in place of the fuel rod $G_3$ used in the first embodiment. The fuel rod $G_7$ is materially identical to the fuel rod $G_3$ except that its lower region has a mean enrichment $e_3$ in contrast to the fuel rod $G_3$ which has a mean enrichment $e_4$ in its lower region. The fuel assembly 60 of this embodiment has a uniform distribution of gadolinea because it is devoid of the fuel rod $G_4$ shown in FIG. 13. This embodiment, therefore, cannot produce the spectrum shift effect which is obtained with the fuel assembly 30 of the first embodiment.

Therefore, the fuel assembly 60 of this embodiment produces all the advantages produced by the fuel assembly 30 other than the advantage derived from the spectrum shift effect.

Figure 20:
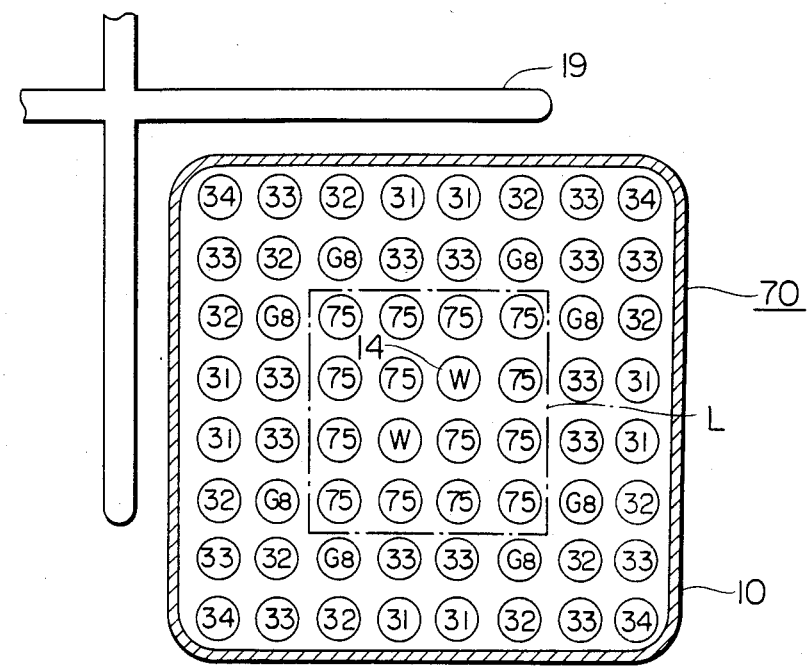
Figure 21:
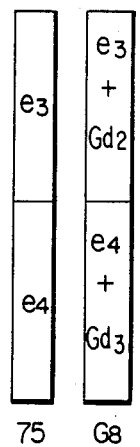
FIG. 21 is an illustration of enrichment distributions in fuel rods constituting the fuel assembly shown in FIG. 20.

FIG. 20 shows a further embodiment of the invention. The fuel assembly 70 of this embodiment employs fuel rods 31 to 34 shown in FIG. 13 and fuel rods 75 and $G_8$ shown in FIG. 21. These fuel rods are arranged in a manner shown in FIG. 20. The fuel rod 75 and $G_8$ has a greater enrichment in the upper region thereof above the level ½ of the fuel effective length as measured from the bottom of the same than in the lower region below the above-mentioned level. The fuel rod 75 does not contain gadolinea. The fuel rod $G_8$ has a greater gadolinea density $Gd_2$ in its upper region above the level ½ of the fuel effective length as measured from the bottom of the same than that $Gd_3$ in the lower region thereof below the above-mentioned level.

Thus, the fuel assembly 70 of this embodiment employs lower enrichment fuel rods which do not contain gadolinea and which have upper and lower regions of different enrichments. Therefore, the difference in the local power between the upper and lower regions can be reduced as compared with that in the known fuel assembly 23, although the difference is larger than that in the fuel assembly 30 of the first embodiment. The fuel assembly 70 of this embodiment produces effects substantially the same as those produced by the fuel assembly 30 except the point mentioned above.

Figure 22:
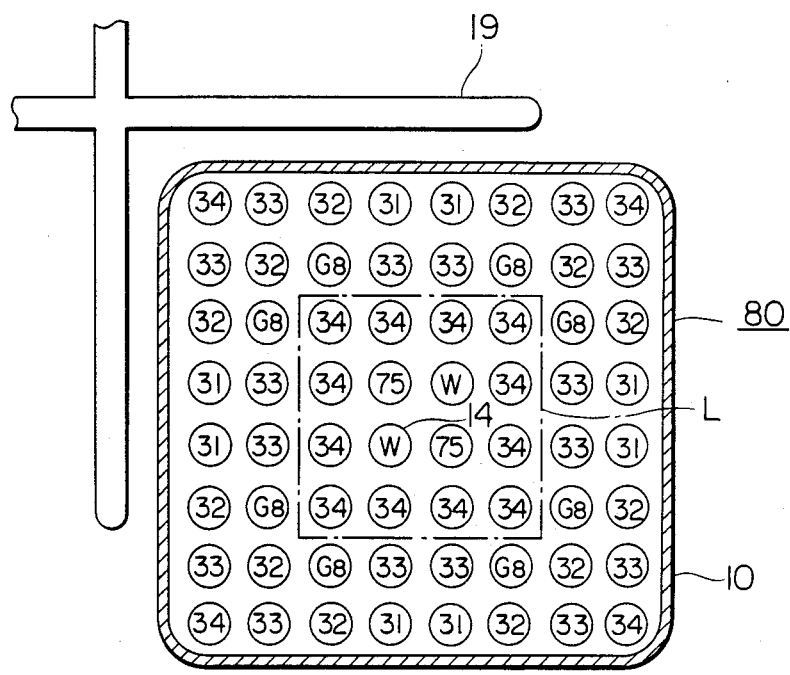

FIG. 22 shows a further embodiment of the invention. The fuel assembly 80 of this embodiment employs the aforementioned fuel rods 31 to 34, 75 and $G_8$ arranged in a manner shown in FIG. 22. This fuel assembly is similar to the fuel assembly 70 of the preceding embodiment except that some of the fuel rods 75 in the central region thereof are substituted by the fuel rods 34. The fuel assembly 80 of this embodiment exhibits a difference in the local power between the upper and lower regions which is reduced as compared with that in the fuel assembly 70 by an amount corresponding to the number of reduction of the fuel rods having difference of enrichment between their upper and lower regions.

Figure 23:
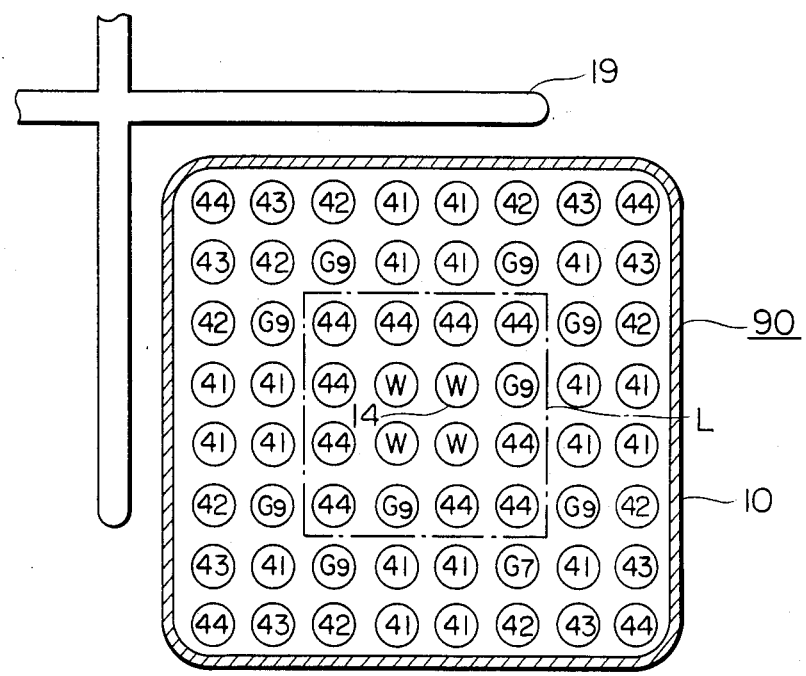
Figure 24:
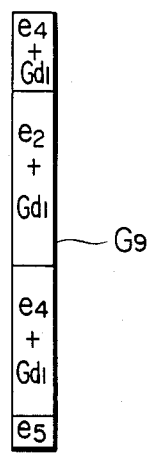
FIG. 24 is an illustration of enrichment distributions of fuel rods constituting the fuel assembly shown in FIG. 23.

FIG. 23 shows a still further embodiment of the invention. The fuel assembly 90 of this embodiment employs fuel rods 41 to 44 and $G_6$ shown in FIG. 15 and fuel rods $G_9$ shown in FIG. 24. These fuel rods are arranged in a manner shown in FIG. 23. The fuel rod $G_9$ has a length smaller than that of the fuel rods 41 to 44 by amount corresponding to the length of natural uranium layer $e_5$ provided in the fuel rods 41 to 44. It is to be noted also that the fuel rod $G_9$ has an upper-most region of a length within 3/24 of the fuel effective length (this equals to effective length of fuel rods 41 to 44). This uppermost region is charged with fuel pellets of low enrichment $e_4$. Thus, the fuel rod $G_9$ has three axial regions besides the lowermost region of natural uranium $e_5$. This fuel assembly 90 has low enrichment at the upper ends of the fuel rods $G_9$ so that the infinite multiplication factor in the cold state of the reactor can be suppressed effectively, so that a large reactor shutdown margin can be preserved. The axial distribution of enrichment in the fuel assembly 90 is created by providing a difference in the enrichment between the upper and lower regions of the fuel rods which do not contain gadolinea, so that the difference in the local power between different axial regions can be suppressed as in the case of the fuel assembly 40 explained before.

Figure 25:
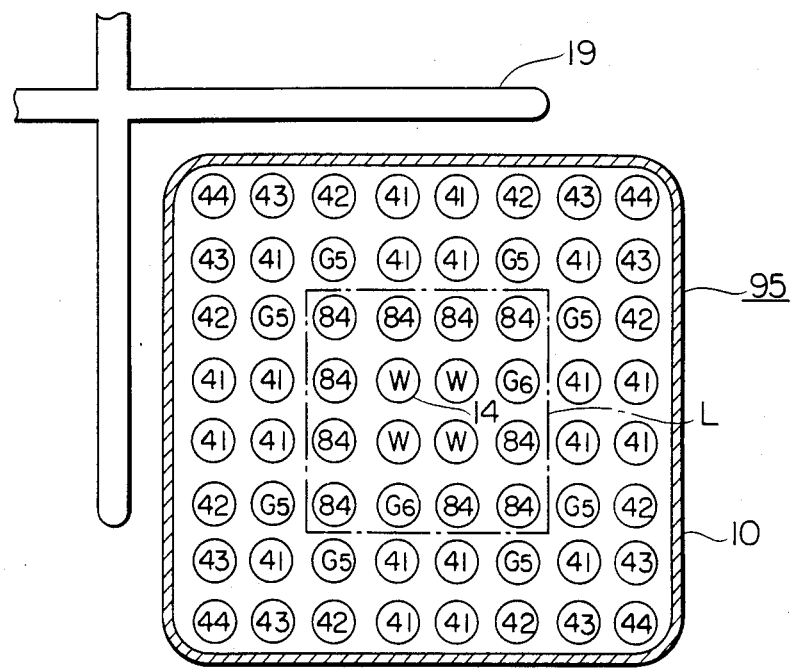
Figure 26:
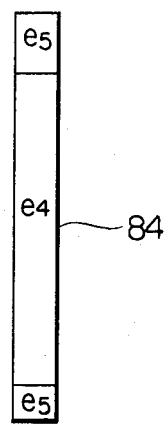
FIG. 26 is an illustration of enrichment distributions in fuel rods constituting the fuel assembly shown in FIG. 25.

FIG. 25 shows a still further embodiment of the invention. The fuel assembly 95 of this embodiment employs the fuel rods 41 to 44, $G_5$ and $G_6$ shown in FIG. 15 and the fuel rods 84 shown in FIG. 26. These fuel rods are arranged in a manner shown in FIG. 25. The fuel rod 84 has the total length of layer of natural uranium $e_5$ greater than that in the fuel rods 41 to 44. In fact, the length of the layer of natural uranium in the fuel rod 84 reaches 1/6 of the fuel effective length of this fuel rod. The enrichment in the upper end of the fuel assembly and, hence, the reactor shut-down margin is increased also in this case. The difference in the local power distribution in the outer peripheral region between different cross-sections of the fuel assembly can be reduced provided that the fuel rods 84 are disposed in the portion of the cross-section of the fuel assembly other than the outer peripheral region and that the length of the layer of the natural uranium is less than 1/6 of the effective fuel length. Thus, the fuel assembly 95 of this embodiment produces substantially the same effect as those produced by the fuel assembly 40 explained before.

Figure 27:
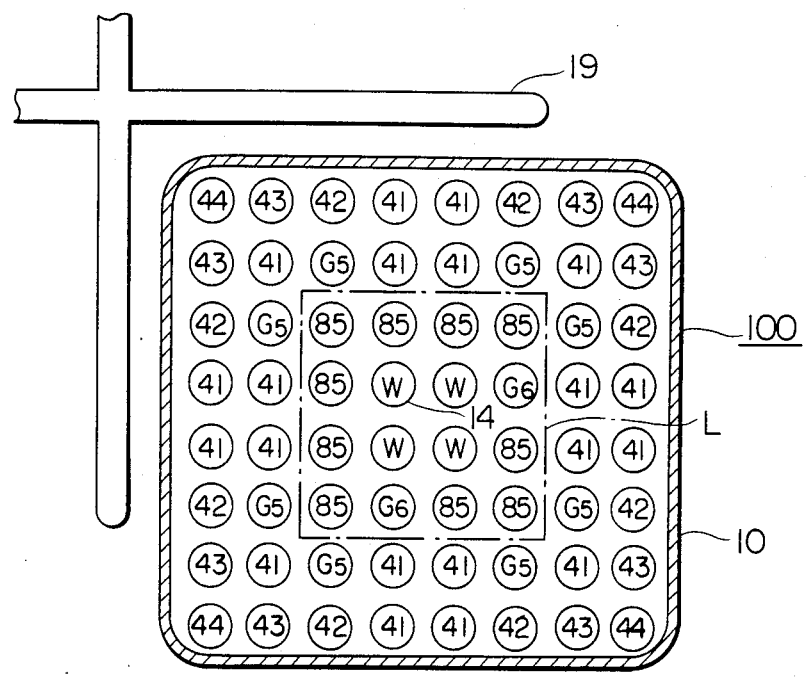
Figure 28:
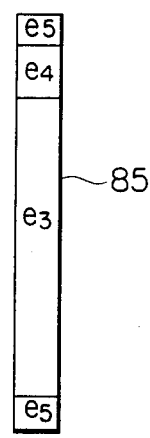
FIG. 28 is an illustration of enrichment distributions in fuel rods constituting the fuel assembly shown in FIG. 27.

The increase in the reactor shut-down margin through a reduction of the enrichment in the upper end portion of the fuel assembly and the constant local power distribution in the outer peripheral portion of the fuel assembly over almost the entire axial region of the fuel assembly are attainable also by a fuel assembly 100 of a still further embodiment of the invention shown in FIG. 27. The fuel assembly 100 employs fuel rods 41 to 44, $G_5$ and $G_6$ shown in FIG. 15 and fuel rods 85 shown in FIG. 28. These fuel rods are arranged in a manner shown in FIG. 27. The fuel rod 84 is provided at its upper and lower ends with layers of natural uranium $e_5$ each having an axial length of 1/24 of the fuel effective length thereof. In addition, the fuel rod 84 is provided with a region of a small enrichment $e_4$ ($e_4 < e_3$) which extends over a length of $\frac{1}{8}$ of the fuel effective length downwardly from the lower end of the upper layer of the natural uranium $e_5$. The axial enrichment distribution of the fuel rod 85 can be regarded as being materially constant, provided that the length of the region of reduced enrichment $e_4$ is less than $\frac{1}{8}$ of the fuel effective length. By arranging the fuel rods 85 in the central region of the cross-section of the fuel assembly, it is possible to increase the local power in the outer peripheral region of cross-sections of the fuel assembly as a mean and the difference in the local power distribution between different axial regions can be minimized as in the case of the fuel assembly 40.

As has been described, according to the invention, it is possible to remarkably reduce the difference in the power distribution between different cross-sections taken at different positions along the axis of the fuel assembly, thereby attaining a higher discharged exposure of the fuel assembly and, hence, a higher fuel economy.

What is claimed is:

1. A nuclear fuel assembly having a plurality of fuel rods each containing a multiplicity of fuel pellets, comprising: first fuel rods each containing a burnable poison over substantially the entire axial length thereof, said first fuel rod having upper and lower axial regions and a greater mean enrichment in the upper axial region thereof than that in the lower axial region thereof; and second fuel rods containing no burnable poison and having a uniform enrichment distribution over substantially the entire axial length thereof.

2. A nuclear fuel assembly according to claim 1, wherein the boundary between the said upper axial region and said lower axial region of said first fuel rod is positioned within a range between $\frac{1}{3}$ and 7/12 of the overall length of said first fuel rod as measured from the lower end thereof.

3. A nuclear fuel assembly according to claim 1, wherein said first fuel rods are disposed in the portion of said fuel assembly except the outermost peripheral portion thereof.

4. A nuclear fuel assembly according to claim 3, wherein the boundary between the said upper axial region and said lower axial region of said first fuel rod is positioned within a range between $\frac{1}{3}$ and 7/12 of the overall length of said first fuel rod as measured from the lower end thereof.

5. A nuclear fuel assembly according to claim 1, wherein the infinite multiplication factor in the upper region of said fuel assembly is greater than that in the lower region thereof.

6. A nuclear fuel assembly according to claim 5, wherein said first fuel rods are disposed in the portion of said fuel assembly except the outermost peripheral portion thereof.

7. A nuclear fuel assembly according to claim 6, wherein the boundary between the said upper axial region and said lower axial region of said first fuel rod is positioned within a range between $\frac{1}{3}$ and 7/12 of the overall length of said first fuel rod as measured from the lower end thereof.

8. A nuclear fuel assembly having a plurality of fuel rods each containing a multiplicity of fuel pellets, comprising: first fuel rods each containing a burnable poison over substantially the entire axial length thereof, said first fuel rod having upper and lower axial regions and a greater mean enrichment in the upper axial region thereof than that in the lower axial region thereof; and second fuel rods containing no burnable poison and having a uniform enrichment distribution over substantially the entire axial length thereof, wherein the mean enrichment in the outer peripheral portion of a cross-section of said fuel assembly perpendicular to the axis of said fuel assembly is greater than that in the central portion thereof.

9. A nuclear fuel assembly according to claim 8, wherein the boundary between the said upper axial region and said lower axial region of said first fuel rod is positioned within a range between $\frac{1}{3}$ and 7/12 of the overall length of said first fuel rod as measured from the lower end thereof.

10. A nuclear fuel assembly according to claim 8, wherein said first fuel rods are disposed in the portion of said fuel assembly except the outermost peripheral portion thereof.

11. A nuclear fuel assembly according to claim 10, wherein the boundary between the said upper axial region and said lower axial region of said first fuel rod is positioned within a range between $\frac{1}{3}$ and 7/12 of the overall length of said first fuel rod as measured from the lower end thereof.

12. A nuclear fuel assembly according to claim 8, wherein the infinite multiplication factor in the upper region of said fuel assembly is greater than that in the lower region thereof.

13. A nuclear fuel assembly according to claim 12, wherein said first fuel rods are disposed in the portion of said fuel assembly except the outermost peripheral portion thereof.

14. A nuclear fuel assembly according to claim 13, wherein the boundary between the said upper axial region and said lower axial region of said first fuel rod is positioned within a range between $\frac{1}{3}$ and 7/12 of the overall length of said first fuel rod as measured from the lower end thereof.

15. A nuclear fuel assembly according to claim 2, further comprising third fuel rods, said third fuel rods containing an enriched nuclear fuel material substantially over the entire axial length thereof, said third fuel rods having upper and lower axial regions with a boundary therebetween corresponding to the boundary of said first fuel rods, said third fuel rods containing a burnable poison in said upper axial region and no burnable poison in said lower axial region.

16. A nuclear fuel assembly according to claim 15, wherein each of said first, second and third fuel rods have at least one end region containg natural uranium.

17. A nuclear fuel assembly according to claim 16, wherein each of said second fuel rods have opposite end regions containing natural uranium.

18. A nuclear fuel assembly according to claim 15, further comprising a center portion and an outer peripheral portion surrounding said center portion in a cross-section of said fuel assembly perpendicular to the axis of said fuel assembly, said fuel assembly having a means enrichment which is greater in said outer peripheral portion than in said center portion.

19. A nuclear fuel assembly according to claim 18, wherein said first fuel rods are disposed in the portion of said fuel assembly except the outermost peripheral portion thereof.

20. A nuclear fuel assembly according to claim 19, wherein each of said first, second and third fuel rods have at least one end region containing natural uranium.

* * * * *